A. N. HINCKLEY.
VEHICLE WHEEL.
APPLICATION FILED NOV. 27, 1916.
1,246,269.
Patented Nov. 13, 1917.
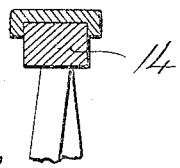
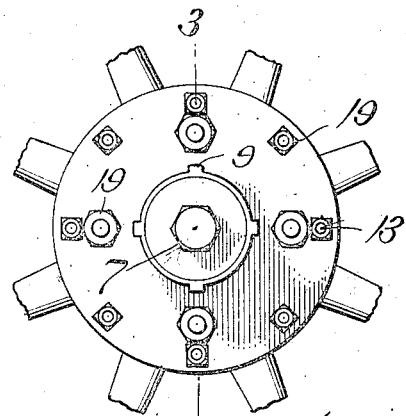
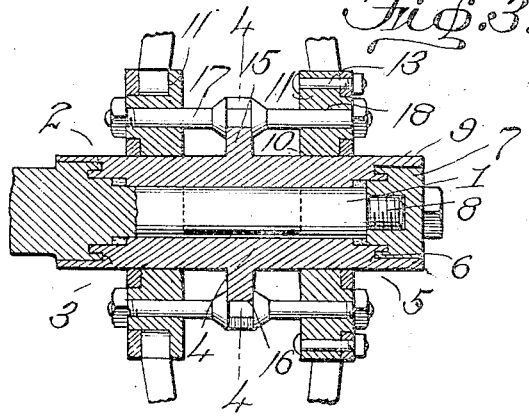
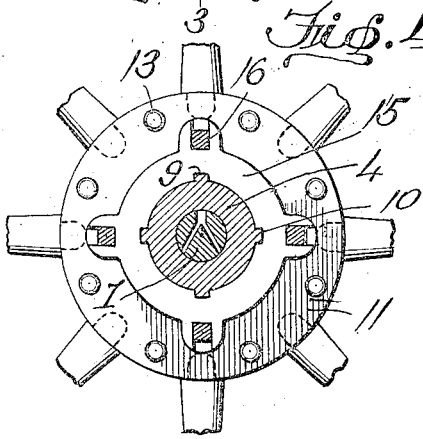
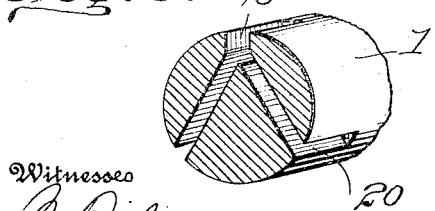
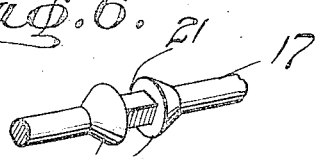
Inventor
Avery N. Hinckley,

UNITED STATES PATENT OFFICE.

AVERY N. HINCKLEY, OF DANBURY, CONNECTICUT.

VEHICLE-WHEEL.

1,246,269.   Specification of Letters Patent.   Patented Nov. 13, 1917.

Application filed November 27, 1916. Serial No. 133,655.

*To all whom it may concern:*

Be it known that I, AVERY N. HINCKLEY, a citizen of the United States, residing at Danbury, in the county of Fairfield, State of Connecticut, have invented certain new and useful Improvements in Vehicle-Wheels; and I do hereby declare the following to be a full, clear, and exact description of the invention, such as will enable others skilled in the art to which it appertains to make and use the same.

The present invention is directed to improvements in vehicle wheels, and has for its object to provide a device of this character constructed in such a manner that the rim can be conveniently tightened upon moving the spoke supporting plates toward each other.

A further object of the invention is to provide a device of this character so constructed that the spoke plates can be moved toward each other so as to effectively stretch the wheel rim without the necessity of removing the spokes or requiring the use of any tool other than a common form of wrench.

A still further object of the invention is to provide a novel form of axle wherein the grease will be retained within the axle so as to assure proper lubrication.

With these and other objects in view, this invention resides in the novel features of construction, formation, combination and arrangement of parts to be hereinafter more fully described, claimed, and illustrated in the accompanying drawing in which:—

Figure 1 is an edge elevation of the wheel, the spokes thereof being shown in cross section.

Fig. 2 is a fragmentary side elevation.

Fig. 3 is a sectional view on line 3—3 of Fig. 2.

Fig. 4 is a sectional view on line 4—4 of Fig. 3.

Fig. 5 is a fragmentary perspective view of the axle.

Fig. 6 is a fragmentary perspective view of one of the connecting rods.

Referring to the drawing 1 indicates the axle, said axle having formed adjacent its inner end an annular flange 2 which engages the annular groove 3 formed in the box 4. The outer end of the box 4 is provided with an annular groove 5 for receiving the annular flange 6 carried by the nut 7, said nut being engaged on the threaded end 8 of the axle 1.

The box 4 is provided with a plurality of longitudinal ribs 9 which are engaged by the notches 10 formed in the spoke clamping plates 11, said plates being held in clamped engagement with the inner ends of the spokes 12 by clamping bolts 13. The outer ends of the spokes are connected to the rim 14.

An annular flange 15 is formed integral with the box 4 and is provided with a plurality of spaced seats 16, the purpose of which will appear later.

Connecting rods 17 are provided and have their ends passed through openings 18 formed in the clamping plates 11 and have engaged on their threaded ends clamping nuts 19. Formed intermediate the ends of the rods 17 are spaced collars 20 which provide annular recesses 21 which are adapted to engage the seats 16 so as to prevent longitudinal movement of the rods with respect to the box 4.

It will be noted that the clamping plates 11 are slidably engaged on the box 4 so that when the clamping nuts 19 are rotated in one direction said plates will be moved toward each other thus moving the lower ends of the spokes 12 closer together with the result that the rim 14 will be stretched.

By providing the ribs 9 the plates 11 will be interlocked with the box 4.

The axle 1 is provided for a portion of its length with a vertical slot 19, said slot being in communication with the upper ends of the convergingly arranged slots 20, and since the same are divergingly arranged it is obvious that the lubricant which enters the slot 19 will gravitate through the slots 20 to each side of the axle, thus effectively lubricating the same.

What is claimed is:—

A device of the class described comprising an axle, a box rotatably engaged thereon and having an annular flange encircling the same and provided with seats, clamping plates slidably engaged on the box, rods adjustably connecting the clamping plates and having annular recesses formed intermediate their ends for engagement with the seats, means for interlocking the clamping plates to the box, spokes having their inner ends clamped to said plates, and a rim connected to the outer ends of the spokes.

In testimony whereof, I affix my signature, in the presence of two witnesses.

AVERY N. HINCKLEY.

Witnesses:
   JOHN F. GORMAN,
   E. ROLAND CROFUT.